June 2, 1953      E. C. SPAHN      2,640,324
DOUBLE-ACTING MASTER CYLINDER BRAKE CONTROL
Filed Dec. 16, 1948
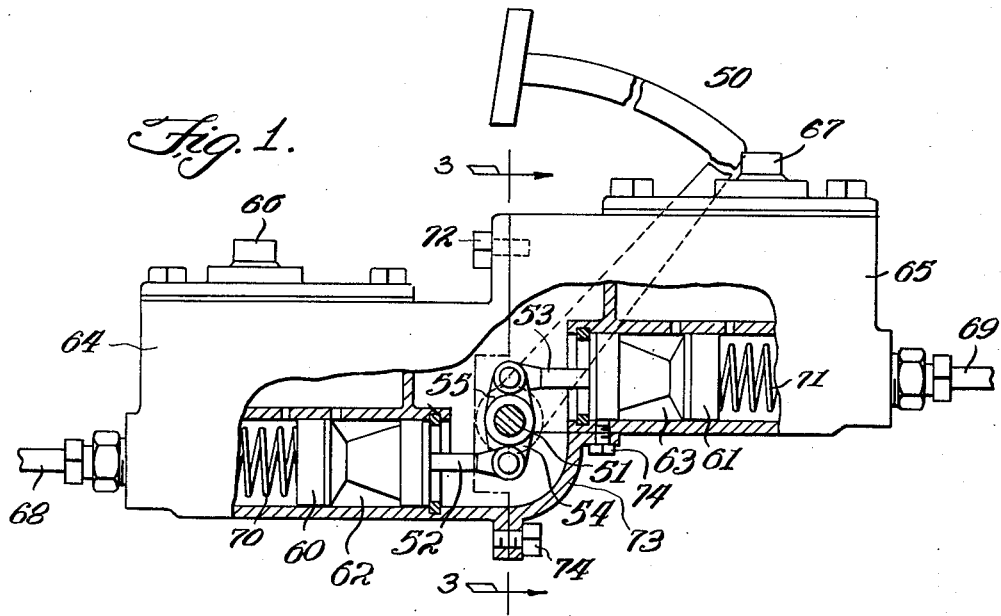
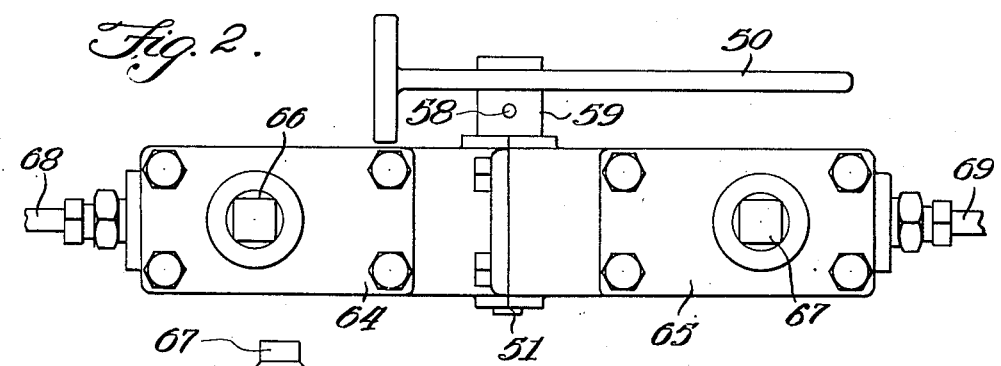
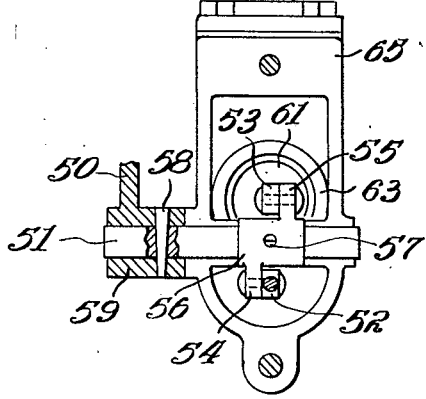
INVENTOR.
*Edward C. Spahn,*
BY *Victor J. Evans & Co.*
ATTORNEYS Patented June 2, 1953

2,640,324

UNITED STATES PATENT OFFICE 2,640,324

DOUBLE-ACTING MASTER CYLINDER BRAKE CONTROL

Edward Clinton Spahn, Portsmouth, Va.

Application December 16, 1948, Serial No. 65,555

1 Claim. (Cl. 60—54.6)

This invention relates to an automobile brake system.

It is an object of the present invention to provide an automobile brake system wherein should the brakes on either the front or rear wheels become inoperative, either the rear brakes or the front wheel brakes would be operated in a smooth and equalized manner.

Other objects of the present invention are to provide a brake system which has separate master cylinders for front and rear wheel brakes respectively, which is of simple construction, easy to install upon the vehicle, inexpensive to manufacture, permits the use of the vehicle even when one set of brakes are out of order, has smooth, quick and equalized action, and efficient in operation.

For other objects and for a better understanding of the invention, reference may be had to the following detailed description taken in connection with the accompanying drawing, in which:

Fig. 1 is a view showing a modification wherein the cylinders are oppositely positioned.

Fig. 2 is a plan view of the device as shown in Figure 1.

Fig. 3 is a cross section taken on line 3—3 of Figure 1.

In the design shown in Figures 1, 2 and 3, the master cylinders are positioned in a common plane and in opposed relation, and in this arrangement the cylinders are actuated by a foot pedal lever 50 on a shaft 51, with the connecting rods 52 and 53 pivotally connected to a rocker arm having offset ends 54 and 55 and a hub 56 that is secured to the shaft 51 by a set screw 57. The lever 50 of the foot pedal is secured to the shaft 51 by a pin 58 in a hub 59 of the lever, as illustrated in Figure 3.

The connecting rods 52 and 53 extend from pistons 60 and 61, respectively, in the master cylinders 62 and 63 and the cylinders are provided in housings 64 and 65, that are provided with filling plugs 66 and 67, respectively. The cylinder 62 may be connected by a tube 68 to the front brakes and the cylinder 63 may be connected by a tube 69 to the rear brakes.

The cylinder 62 is provided with a spring 70 that returns the piston 60 to the neutral position shown in Figure 1, and a similar spring 71 is provided in the cylinder 63 for returning the piston 61.

The cylinder housings 64 and 65 are secured together by bolts 72 and a removable inspection plate 73 is provided between the housings and held by bolts 74, whereby access is provided to the connecting levers between the brake pedal and cylinders.

It should be apparent that there has been provided a brake system wherein upon the failure of either the front or rear brakes of the vehicle, the other brakes may be operated in an equalized manner.

While various changes may be made in the detail construction, it shall be understood that such changes shall be within the spirit and scope of the present invention as defined by the appended claim.

I claim:

In a motor vehicle brake system master cylinder, the combination which comprises a housing having oppositely disposed cylinders therein and said cylinders being in vertically spaced horizontal planes, a shaft journaled in the housing and positioned between the vertically spaced horizontally disposed planes of the cylinders and also midway between the ends of the cylinders, a rocker arm including a hub with offset ends fixedly mounted on said shaft and aligned with the cylinders, connecting rods pivotally connected to opposite ends of said rocker arm and extending into said cylinders, pistons in the cylinders to which said connecting rods are connected, springs in the cylinders urging the pistons toward the ends of the cylinders spaced from the shaft, and a foot pedal fixedly mounted on said shaft, said housing having fluid reservoirs in the upper parts thereof and said reservoirs being in communication with said cylinders.

EDWARD CLINTON SPAHN.

References Cited in the file of this patent

UNITED STATES PATENTS

| Number | Name | Date |
|---|---|---|
| 1,721,213 | Frock | July 16, 1929 |
| 2,062,167 | Dieter | Nov. 24, 1936 |
| 2,131,459 | Weatherhead, Jr. | Sept. 27, 1938 |
| 2,141,358 | Meeks | Dec. 27, 1938 |
| 2,209,343 | Masteller | July 30, 1940 |
| 2,328,685 | Schnell | Sept. 7, 1943 |
| 2,332,301 | Cox | Oct. 19, 1943 |

FOREIGN PATENTS

| Number | Country | Date |
|---|---|---|
| 684,369 | France | Mar. 17, 1930 |